United States Patent
Zheng et al.

(10) Patent No.: US 10,527,721 B2
(45) Date of Patent: Jan. 7, 2020

(54) TERAHERTZ ISAR IMAGING METHOD AND SYSTEM

(71) Applicant: Tsinghua University, Beijing (CN)

(72) Inventors: Xiao-Ping Zheng, Beijing (CN); Zhan Ou, Beijing (CN); Xiao-Jiao Deng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 16/438,465

(22) Filed: Jun. 12, 2019

(65) Prior Publication Data

US 2019/0293785 A1   Sep. 26, 2019

Related U.S. Application Data

(63) Continuation of application No. PCT/CN2018/092447, filed on Jun. 22, 2018.

(30) Foreign Application Priority Data

Oct. 25, 2017   (CN) .......................... 2017 1 1009824

(51) Int. Cl.
*G01S 13/90* (2006.01)
*G01S 13/88* (2006.01)
*G01S 7/41* (2006.01)

(52) U.S. Cl.
CPC ............ *G01S 13/9064* (2019.05); *G01S 7/41* (2013.01); *G01S 13/887* (2013.01); *G01S 13/904* (2019.05)

(58) Field of Classification Search
CPC ........................... G01S 13/9064; G01S 13/887
See application file for complete search history.

(56) References Cited

U.S. PATENT DOCUMENTS

| | | | |
|---|---|---|---|
| 6,815,683 B2* | 11/2004 | Federici | G01N 21/3581 250/330 |
| 7,205,926 B2 | 4/2007 | Rowe et al. | |
| 2004/0174289 A1* | 9/2004 | Singh | G01S 13/04 342/22 |
| 2007/0120666 A1* | 5/2007 | Rowe | G01S 13/887 340/552 |
| 2010/0117885 A1* | 5/2010 | Holbrook | H04N 1/107 342/22 |

(Continued)

FOREIGN PATENT DOCUMENTS

| | | |
|---|---|---|
| CN | 104698456 | 3/2006 |
| CN | 103454637 | 12/2013 |
| CN | 103760558 | 4/2014 |

(Continued)

OTHER PUBLICATIONS

International Search Report of PCT/CN2018/092447.

*Primary Examiner* — Marcus E Windrich

(57) ABSTRACT

The disclosure relates to a method and a system for terahertz ISAR imaging. In the method, a chirp signal is transmitted to an imaging target moving at a preset speed and a terahertz ISAR echo signal is received. The terahertz ISAR echo signal is matched filtered in a fast time domain, baseband transformed in a slow time domain, corrected to eliminate a time domain zero offset, baseband transformed, discretized, interpolated, and two-dimensional inverse Fourier transformed to obtain a two-dimensional image of the imaging target.

9 Claims, 3 Drawing Sheets

(56) References Cited

U.S. PATENT DOCUMENTS

2010/0265117 A1\* 10/2010 Weiss .................... G01S 13/003
  342/22
2015/0285907 A1  10/2015 Mohamadi

FOREIGN PATENT DOCUMENTS

| CN | 105676223 | 6/2016 |
| CN | 105891900 | 8/2016 |
| CN | 106093937 | 11/2016 |
| CN | 108020833 | 5/2018 |

\* cited by examiner

TERAHERTZ ISAR IMAGING METHOD AND SYSTEM

CROSS-REFERENCE TO RELATED APPLICATIONS

This application claims all benefits accruing under 35 U.S.C. § 119 from China Patent Application No. 201711009824.5, filed on Oct. 25, 2017 in the State Intellectual Property Office of China, the content of which is hereby incorporated by reference. This application is a continuation under 35 U.S.C. § 120 of international patent application PCT/CN2018/092447 filed on Jun. 22, 2018, the content of which is also hereby incorporated by reference.

FIELD

The present disclosure relates to the field of imaging technology, particularly to methods and systems for security imaging using terahertz inverse synthetic aperture radar (ISAR).

BACKGROUND

The purpose for security screening of a human body is to detect concealed weapons, military or police equipment or imitations, explosives, knives, inflammables, and other items that are hazards to safety. Conventional imaging technology in a security screening system adopts X-ray as a radiation source, which may be harmful to the human body. Terahertz wave with small photon energy is relatively safe and reliable compared to X-ray, and is suitable for a high-resolution imaging of a concealed object because of the short wavelength.

However, high imaging speed and high imaging accuracy of terahertz imaging are difficult to be satisfied at the same time.

SUMMARY

What is needed, thereof, is to provide a terahertz ISAR imaging method and system satisfying both high speed processing and high imaging accuracy.

A method for terahertz ISAR imaging comprises:

transmitting a linear frequency modulation signal (e.g., a chirp signal) from a terahertz ISAR to an imaging target, and receiving an echo signal $s_r(t,u)$ by the terahertz ISAR, the imaging target moving at a preset speed;

setting a target reference position, and acquiring a reference signal $s_0(t)$ according to the target reference position;

using the reference signal $s_0(t)$ to perform a matched filtering in a fast time domain on the echo signal $s_r(t,u)$ to obtain a data matrix $S_M(\omega,u)$;

performing a baseband transformation in a slow time domain on the data matrix $S_M(\omega,u)$ to obtain a baseband transformed data matrix $S_b(\omega,u)$ and a corresponding signal spectrum $S_b(\omega,k_u)$;

correcting the baseband transformed data matrix $S_b(\omega,u)$ to eliminate a fast time domain zero offset, thereby obtaining a corrected data matrix $S(w,k_u)$;

using a phase function of the reference signal to perform another baseband transformation on the corrected data matrix $S(w,k_u)$ to obtain a first target function $F(k_x, k_y)$;

discretizing the first target function $F(k_x, k_y)$ to obtain $F(k_{xmn}, k_{ymn})$, and interpolating on a $k_{xmn}$ domain to uniformly distribute the $F(k_{xmn}, k_{ymn})$ on the $k_{xmn}$ domain; and performing an inverse transformation on the interpolated first target function to obtain a second target function $f(x_n, y_n)$ thereby generating a two-dimensional image of the imaging target.

In an embodiment, the step of using the reference signal $s_0(t)$ to perform the matched filtering on the echo signal $s_r(t,u)$ comprises performing the matched filtering on the echo signal through a demodulation method.

In an embodiment, in the step of performing the baseband transformation in the slow time domain on the data matrix $S_M(\omega,u)$, the baseband transformation satisfies $S_b(\omega,u) = S_M(\omega,u)\exp(-j2k_c \sin\theta_c u)$, wherein $$k_c = \frac{2\pi f_c}{c}, \theta_c = \arctan\left(\frac{Y_c}{X_c}\right),$$

c is a speed of a terahertz wave, and $f_c$ is a frequency of the terahertz wave.

In an embodiment, the step of performing the baseband transformation on the data matrix $S_M(\omega,u)$ to obtain the baseband transformed data matrix $S_b(\omega,u)$ and the corresponding signal spectrum $S_b(\omega,k_u)$ comprises: performing a Fourier transformation in the slow time domain on the baseband transformed data matrix $S_b(\omega,u)$ to obtain the signal spectrum $S_b(\omega,k_u)$.

In an embodiment, the step of correcting the baseband transformed data matrix $S_b(\omega,u)$ to eliminate the fast time domain zero offset comprises: correcting the baseband transformed data matrix $S_b(\omega,u)$ by the following formula:

$$S(\omega,k_u) = S_b(\omega,k_u)\exp(-j\omega T_c).$$

In an embodiment, in the step of using the phase function of the reference signal to perform the baseband transformation on the corrected data matrix $S(w,k_u)$, the baseband transformation satisfies $F(k_x,k_y) = S(\omega,k_u)\exp(j\sqrt{4k^2-k_u^2}X_c+jk_u Y_c)$, wherein $k_x=\sqrt{4k^2-k_u^2}$, $k_y=k_u$.

In an embodiment, in the step of discretizing the first target function $F(k_x,k_y)$ to obtain $F(k_{xmn},k_{ymn})$, and interpolating on the $k_{xmn}$ domain, the interpolating is performed through a Stolt interpolation method satisfying $$F(k_x, k_{ymn}) = \sum_n J_m(n\Delta_\omega) F(n\Delta_{k_x}, k_{ymn}) h(k_x - n\Delta_{k_x})$$

wherein $$h(k_x) = \text{sinc}\left(\frac{k_x}{\Delta_{k_x}}\right), J_m(\omega) = \frac{4k}{c\sqrt{4k^2+k_{um}^2}}.$$

A system for terahertz ISAR imaging comprising:

a terahertz ISAR configured to transmit a terahertz wave to an imaging target and receive an echo signal;

a travolator configured to horizontally convey the imaging target to synchronously move the imaging target with the travolator;

a control unit configured to control an operation of the terahertz ISAR and a speed of the travolator; and an image processing unit creating an image for the imaging target according to the echo signal and the speed of the travolator.

In an embodiment, the image processing unit further comprises:

a reference signal generating module configured to generate a reference signal according to a hypothetical target reference position $(X_c, Y_c)$;

a matched filtering module configured to receive a reference signal $s_0(t)$ generated by the reference signal generating module, and use the reference signal $s_0(t)$ to perform a matched filtering in a fast time domain on the echo signal $s_r(t,u)$ to obtain a data matrix $S_M(\omega,u)$;

a first baseband transform module, configured to receive the data matrix $S_M(\omega,u)$, and perform a baseband transformation in a slow time domain on the data matrix $S_M(\omega,u)$ to obtain a baseband transformed data matrix $S_b(\omega,u)$ and a corresponding signal spectrum $S_b(\omega,k_u)$;

a zero offset elimination module, configured to receive the signal spectrum $S_b(\omega,k_u)$ obtained by the first baseband transform module, correct the signal spectrum $S_b(\omega,k_u)$ to eliminate a fast time domain zero offset, and obtain a corrected data matrix $S_b(\omega,k_u)$, wherein $S(\omega,k_u)=S_b(\omega,k_u)\exp(-j\omega T_c)$;

a second baseband transform module, configured to receive the corrected data matrix $S(w,k_u)$ from the zero offset elimination module, and use a phase function of the reference signal to perform another baseband transformation on the corrected data matrix $S(w,k_u)$ to obtain a first target function $F(k_x,k_y)$;

a difference module, configured to receive the first target function $F(k_x,k_y)$ obtained by the second baseband transform module, discretize the first target function $F(k_x,k_y)$ to obtain $F(k_{xmn},k_{ymn})$, and interpolate on a $k_{xmn}$ domain to uniformly distribute the $F(k_{xmn},k_{ymn})$ on the $k_{xmn}$ domain; and a two-dimensional inverse Fourier transform module, configured to receive the interpolated first target function obtained by the difference module, and perform a two-dimensional inverse Fourier transformation on the interpolated first target function to obtain a second target function $f(x_n, y_n)$ which is a two-dimensional image of the imaging target.

In an embodiment, the terahertz ISAR transmits signal in a transmitting power of 5 mW, a center frequency of 340 GHz, and a bandwidth of 7.2 GHz.

The method and system for terahertz ISAR imaging convert an imaging target from a non-cooperative target to a cooperative target, thereby reducing an interference of the imaging target's own motion on the echo signal, and the obtained echo data is more suitable for a high-resolution imaging. The method and system for terahertz ISAR imaging satisfy both the processing time and the accuracy, not only meet the accuracy requirement for imaging concealed dangerous items in security screening, but is also a real-time fast security imaging method and system.

BRIEF DESCRIPTION OF THE DRAWINGS

Implementations are described by way of example only with reference to the attached figures.

DETAILED DESCRIPTION

Numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The present application discloses embodiments of a method and a system for terahertz ISAR imaging.

Figure 1:
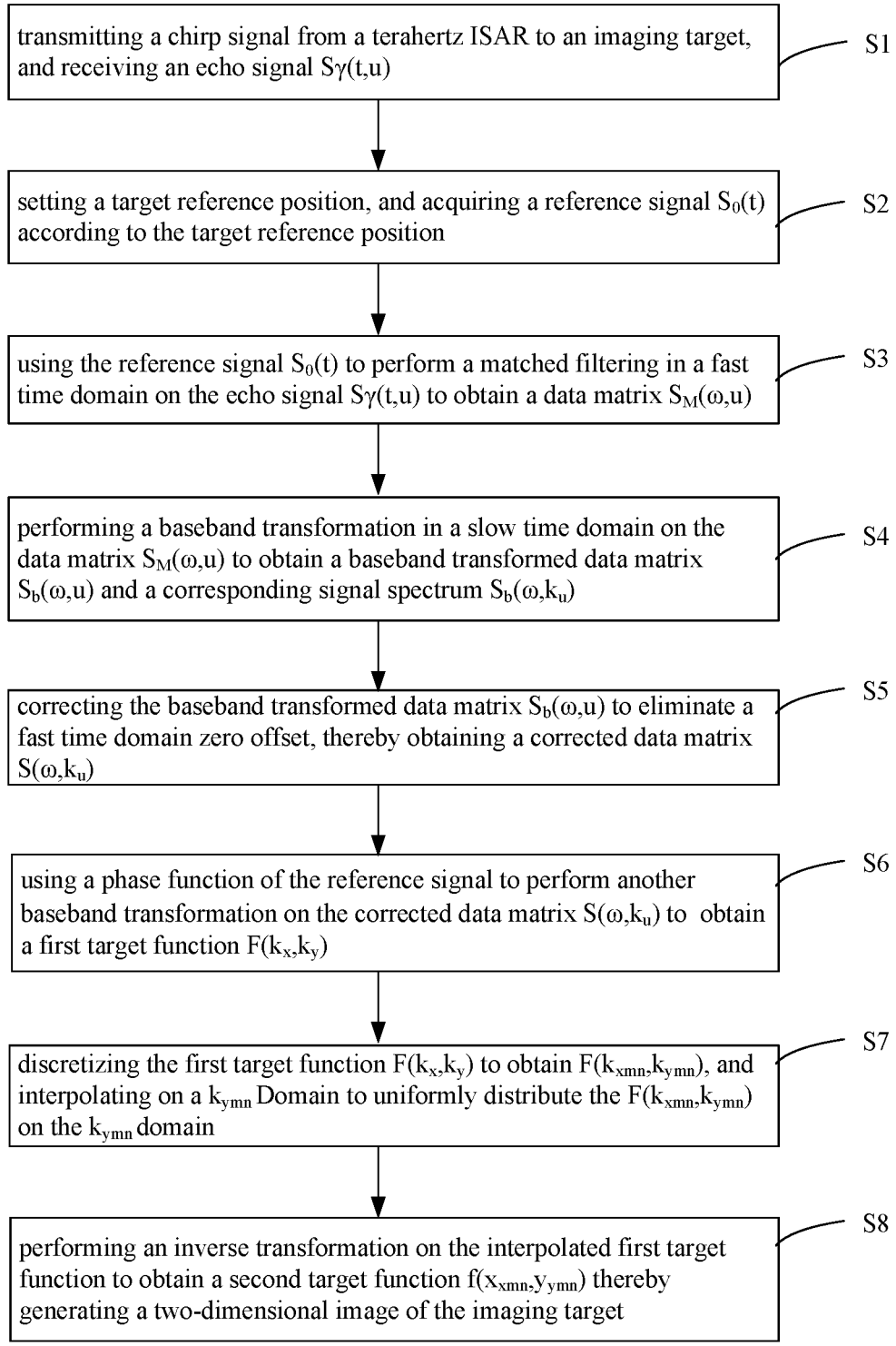
FIG. 1 is a flowchart of an embodiment of a method for terahertz ISAR imaging.

Referring to FIG. 1, an embodiment of a method for terahertz inverse synthetic aperture radar (ISAR) imaging comprises the following steps:

S1, transmitting a linear frequency modulation signal (e.g., a chirp signal) from a terahertz ISAR to an imaging target, and receiving an echo signal $S_r(t,u)$;

S2, setting a target reference position $(X_c,Y_c)$, and acquiring a reference signal $S_0(t)$ according to the target reference position $(X_c, Y_c)$, wherein $$s_0(t) = s_t\left(t - \frac{2\sqrt{X_c^2 + Y_c^2}}{c}\right);$$

S3, using the reference signal $s_0(t)$ to perform a matched filtering in the fast time domain on the echo signal $s_r(t,u)$ to obtain a data matrix $S_M(\omega,u)$;

S4, performing a baseband transformation in a slow time domain on the data matrix $S_M(\omega,u)$ to obtain a baseband transformed data matrix $S_b(\omega,u)$ and a corresponding signal spectrum $S_b(\omega,k_u)$;

S5, correcting the baseband transformed data matrix $S_b(\omega,u)$ to eliminate fast time domain zero offset, thereby obtaining a corrected data matrix $s(w,k_u)$, wherein $S(\omega,k_u)=S_b(\omega,k_u)\exp(-j\omega T_c)$;

S6, using a phase function of the reference signal to perform another baseband transformation on the corrected data matrix $(w,k_u)$ to obtain a first target function $F(k_x,k_y)$;

S7, discretizing the first target function $F(k_x,k_y)$ to obtain $F(k_{xmn},k_{ymn})$, and interpolating on a $k_{xmn}$ domain to uniformly distribute the $F(k_{xmn},k_{ymn})$ on the $k_{xmn}$ domain;

S8, performing a two-dimensional inverse Fourier transformation on the interpolated first target function to obtain a second target function $f(x_n, y_n)$, which is a two-dimensional image of the imaging target.

In step S1, a moving speed of the imaging target is predetermined, and in one embodiment the imaging target is doing a rectilinear motion at a uniform speed. The signal transmitted from the terahertz ISAR can be a chirp signal. The carrier signal of the terahertz ISAR is $e^{j2\pi fct}$. The transmitted pulse signals are sequentially and repetitively transmitted at intervals with period time of T. The transmitting time, which is also called "slow time", of each pulse signal is represented by $t_m$, and $t_m=mT$ (m=0, 1, 2 . . . ). The "fast time" is a period of time of wave propagation.

In step S2, the target reference position $(X_c,Y_c)$ is a preset reference position. X and Y are coordinates of the target reference position respectively, and c is the subscript of the target reference position. According to the target reference position $(X_c,Y_c)$, a reference signal can be given, which is represented by $$s_0(t) = s_t\left(t - \frac{2\sqrt{X_c^2 + Y_c^2}}{c}\right),$$

wherein $s_t$ and $s_0$ have the same form, and both are chirp signals, but $s_t$ has a time delay. The spectrum of the reference signal can be represented by $S_0(\omega)=S_t(\omega)\exp(-j2k\sqrt{X_c^2+Y_c^2})$.

In step S3, as the bandwidth of the terahertz wave is large, the matched filtering can be performed through a demodulation method.

In step S4, a transmission signal suitable for channel transmission can be obtained through the baseband transformation, and a range migration of azimuth dimension can be corrected well, so that the imaging accuracy can be relatively high.

The process of baseband transformation can be represented by $S_b(\omega,u)=S_M(\omega,u)\exp(-j2k_c \sin \theta_c u)$, wherein $$k_c = \frac{2\pi f_c}{c}, \theta_c = \arctan\left(\frac{Y_c}{X_c}\right),$$

c is the speed of the terahertz wave, and $f_c$ is the frequency of the terahertz wave.

The signal spectrum $S_b(\omega,k_u)$ can be obtained by performing a Fourier transformation in the slow time domain on the baseband transformed data matrix $S_b(\omega,u)$.

In step S5, the fast time domain zero offset is usually caused by a fast Fourier transformation. The correcting the baseband transformed data matrix $S_b(\omega,u)$ to eliminate the fast time domain zero offset can be represented by $S(\omega,k_u)=S_b(\omega,k_u)\exp(-j\omega T_c)$, wherein $$T_c = \frac{\sqrt{X_c^2+Y_c^2}}{c}.$$

In step S6, the phase function is a phase expression of the reference signal. The process of the baseband transformation on the corrected data matrix $S(w,k_u)$ can be represented by $F(k_x,k_y)=S(\omega,k_u)\exp(j\sqrt{4k^2-k_u^2}X_c+jk_u Y_c)$, wherein $k_x=\sqrt{4k^2-k_u^2}$, $k_y=k_u$.

In step S7, the discretizing can be represented by $k_{ymn}=k_{um}=m\Delta_{k_u}$, wherein $k_{xmn}=\sqrt{4k^2-k_{um}^2}$. The interpolation method is not limited. In one embodiment, the interpolation method can be a Stolt interpolation method represented by $$F(k_x, k_{ymn}) = \sum_n J_m(n\Delta_\omega)F(n\Delta_{k_x}, k_{ymn})h(k_x - n\Delta_{k_x})$$

wherein $$h(k_x) = \mathrm{sinc}\left(\frac{k_x}{\Delta_{k_x}}\right), J_m(\omega) = \frac{4k}{c\sqrt{4k^2+k_{um}^2}}.$$

Steps S4 to S7 are spectral processing in azimuth dimension, and the purpose is to correct the range migration of the azimuth dimension, so that the imaging accuracy is higher, which is also different from conventional two-dimensional FFT method.

Figure 2:
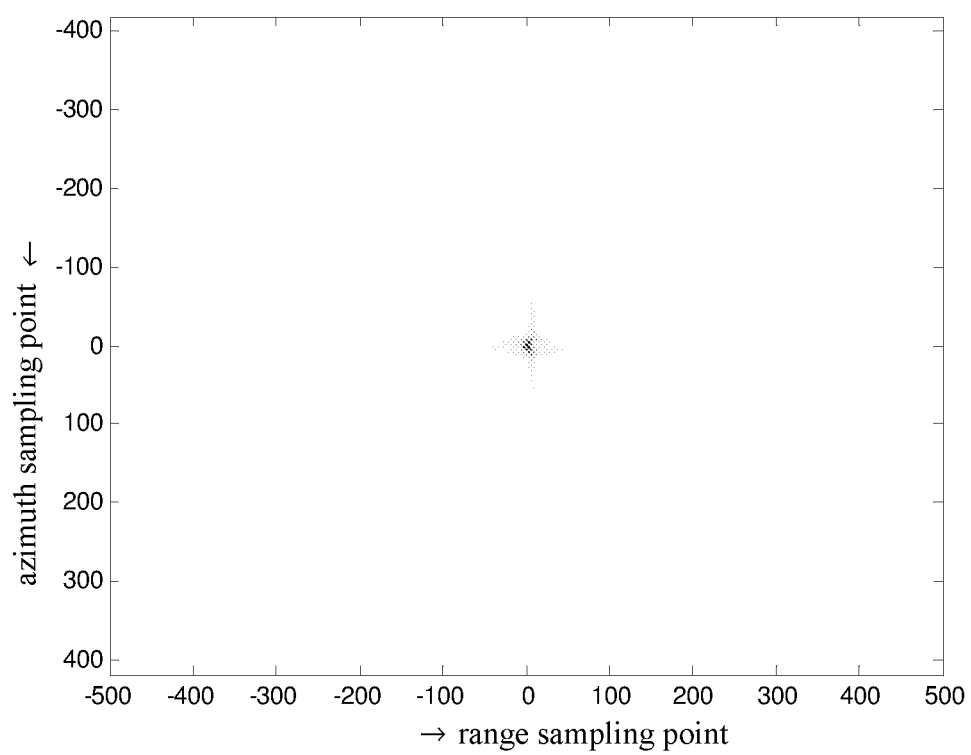
FIG. 2 is a simulation diagram obtained by an embodiment of the method for terahertz ISAR imaging.

FIG. 2 shows a simulation diagram of an imaging target obtained by using the embodiment of the terahertz ISAR imaging method in matlab R2010b. The parameters of the simulation are as follows: a central frequency ($f_c$) of the terahertz ISAR is 340 GHz ($f_c$=340 G Hz), a bandwidth (B) of the transmitting signal is 7.2 GHz (B=7.2 GHz). The imaging target is a point target whose initial position coordinate is (-2, 0), and the imaging target moves forward at a speed of 1 m/s (to the positive direction of the X-axis), and the terahertz ISAR is fixed at the coordinate (0, -10). It can be seen from the simulation image that this imaging method can form a clear image of the imaging target.

Figure 3:
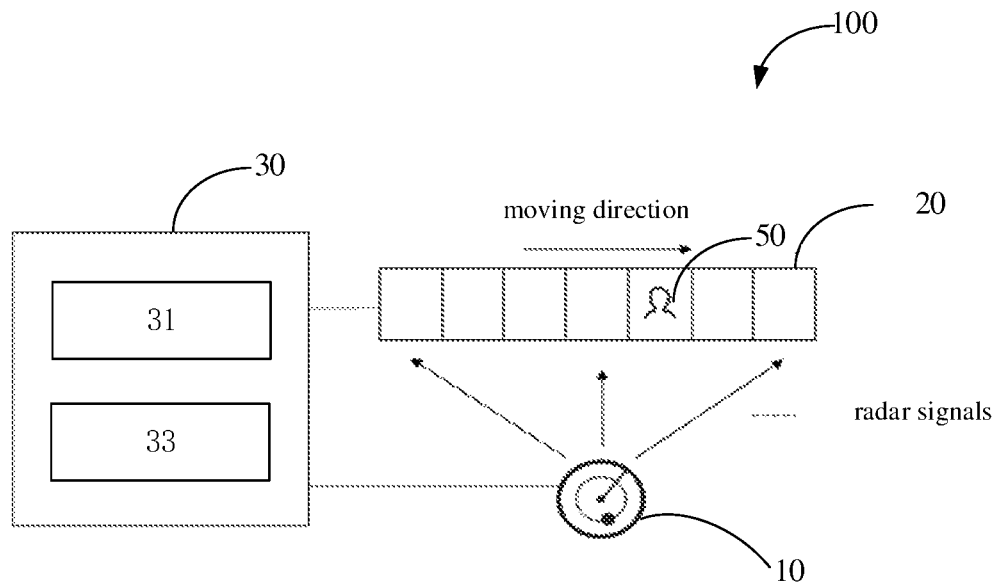
FIG. 3 is a schematic structural view of an embodiment of a system for terahertz ISAR imaging.

Referring to FIG. 3, an embodiment of a system 100 for terahertz ISAR imaging can be used for imaging pedestrians in an airport or a station. The terahertz ISAR imaging system 100 comprises a terahertz radar 10, a travolator 20, and a control center 30. The control center 30 can further comprise a control unit 31 and an image processing unit 33.

The terahertz radar 10 is configured to transmit a terahertz wave to the imaging target 100 and receive an echo signal. The terahertz radar 10 can be an inverse synthetic aperture radar (ISAR). The imaging target 100 can be a passenger receiving a human body security screening at an airport, a station, or the like. The position of the terahertz radar 10 is not limited as long as it can transmit a terahertz wave to the passenger to be screened and receive the echo signal. The signal transmitted by the terahertz radar 10 can be a linear frequency modulation signal such as a chirp signal.

In some embodiments, a distance between the terahertz ISAR and the passenger to be screened can be about 5 to about 20 meters, and a higher imaging resolution can be ensured within this distance. In one embodiment, the distance is 10 meters, the terahertz ISAR transmitting signal in a transmitting power of 5 mW, a center frequency of 340 GHz, a bandwidth of 7.2 GHz, and a frequency modulated continuous wave is adopted, thereby reducing the energy consumption and saving the processing time while ensuring imaging accuracy.

The travolator 20 is configured to horizontally convey the imaging target 100. The imaging target 100 is located on the travolator 20 at the time of screening and remains stationary relative to the travolator 20. The imaging target 100 in one embodiment is the passenger to be screened. The passenger to be screened may have many natural movements, such as swinging hands, lifting legs, turning head, etc. The movements may easily disturb the terahertz radar 10 receiving the echo signals, resulting in artifacts and blurring in the image of the passenger. By adopting the travolator 20 and having the passenger stand thereon and travel with the travolator 20, the moving speed of the passenger is the same with the traveling speed of the travolator, so that the artifacts and blurring can be effectively reduced. The imaging information used by the terahertz ISAR is obtained by combining the echo signals of the apertures of the terahertz ISAR during the moving of the imaging target 100. The smaller the moving speed, the more the echo signals to be processed, and the more difficult the real-time imaging of the system. On the other hand, the larger the moving speed, the less the echo signals, which may cause a resolution degradation. The traveling speed of the travolator 20 can be from about 0.2 m/s to about 1 m/s. In one embodiment, the travolator 20 travels at a constant speed of 0.5 m/s.

The control unit 31 is configured to control operation of the terahertz radar 10 and the travolator 20. Specifically, the control unit 31 can control the distance between the terahertz radar 10 and the travolator 20, and the traveling speed of the translation elevator 20. The control unit 31 can also control variables, such as the signal bandwidth, the center frequency, the pulse duration time, and the repetition period of the transmitting signal from the terahertz radar 10. The control unit 31 is configured to send the above information and variables to the image processing unit 33.

The terahertz ISAR and the image processing unit 33 are activated when the security screening is initiated and are shut down when the security screening is ended. If the speed of the travolator 20 is increased, a higher sampling frequency is required to maintain the same imaging resolution, which can be achieved by increasing the bandwidth of the transmitting signal.

The image processing unit 33 is configured to create the image of the imaging target based on information such as the echo signals of the terahertz radar 10 and the traveling speed of the travolator 20.

Figure 4:
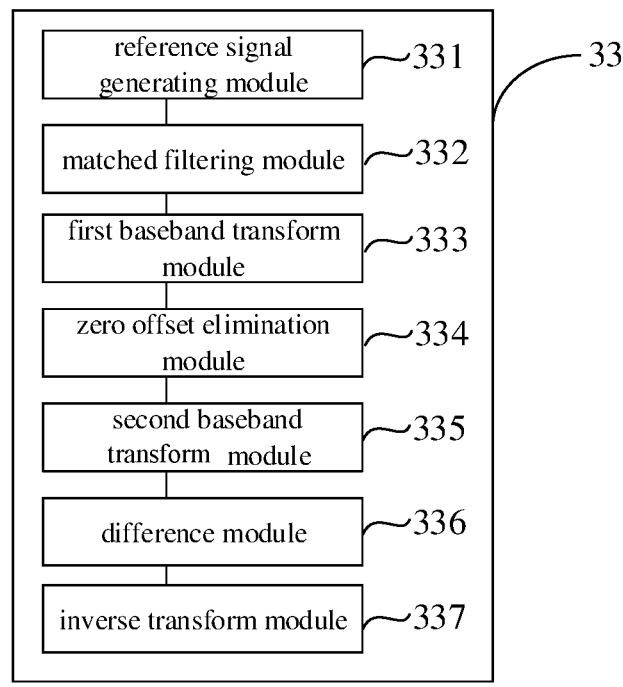
FIG. 4 is a schematic structural view of an embodiment of an image processing unit of the system for terahertz ISAR imaging.

Referring to FIG. 4, the image processing unit 33 can further comprise a reference signal generating module 331, a matched filtering module 332, a first baseband transform module 333, a zero offset elimination module 334, a second baseband transform module 335, a difference module 336, and an inverse transform module 337.

The reference signal generating module 331 is configured to generate a reference signal $$s_0(t) = s_t\left(t - \frac{2\sqrt{X_c^2 + Y_c^2}}{c}\right)$$

according to a hypothetical target reference position $(X_c, Y_c)$.

The matched filtering module 332 is configured to use the reference signal $S_0(t)$ to perform a matched filtering in a fast time domain on the echo signal $s_r(t,u)$ to obtain a data matrix $S_M(\omega,u)$.

The first baseband transform module 333 is configured to receive the data matrix $S_M(\omega,u)$ and perform a baseband transformation in a slow time domain on the data matrix $S_M(\omega,u)$ to obtain a baseband transformed data matrix $S_b(\omega,u)$ and corresponding signal spectrum $S_b(\omega, k_u)$.

The zero offset elimination module 334 is configured to receive the signal spectrum $S_b(\omega,k_u)$ obtained by the first baseband transform module and correct the signal spectrum $S_b(\omega,k_u)$ to eliminate a fast time domain zero offset, and thus obtaining a corrected data matrix $S(w,k_u)$, wherein $S(\omega,k_u) = S_b(\omega,k_u)\exp(-j\omega T_c)$.

The second baseband transform module 335 is configured to receive the corrected data matrix $S(w,k_u)$ from the zero offset elimination module, and use a phase function of the reference signal to perform baseband transformation on the corrected data matrix $S(w,k_u)$ to obtain a first target function $F(k_x,k_y)$.

The difference module 336 is configured to receive the first target function $F(k_x,k_y)$ obtained by the second baseband transform module 335, discretize the first target function $F(k_x,k_y)$ to obtain $F(k_{xmn},k_{ymn})$, and interpolate on the $k_{xmn}$ domain to uniformly distribute $F(k_{xmn},k_{ymn})$ on the $k_{xmn}$ domain.

The inverse transform module 337 is configured to receive the interpolated first target function obtained by the difference module 336, and perform a two-dimensional inverse Fourier) transform on the interpolated first target function to obtain a second target function $f(x_n, Y_n)$ which is a two-dimensional image of the imaging target.

Various operations of the embodiments are provided herein. In an embodiment, the one or more operations may constitute computer readable instructions stored on a computer readable medium. When executed by an electronic device, the instructions cause the computing device to perform the operations. The described order of some or all of the operations should not be construed as implying that the operations must be sequential. Those skilled in the art will appreciate alternative orders that have the benefit of this disclosure. Moreover, it should be understood that not all operations must be present in every embodiment provided herein.

The present disclosure has been shown and described with respect to the embodiments. The present disclosure includes all such modifications and variations, and is only limited by the scope of the appended claims. With particular regard to various functions performed by the above-described components (e.g., elements, resources, etc.), the terms used to describe such components are intended to correspond to performing the specified functions of the components (e.g., they are functionally equivalent). Any component (unless otherwise indicated) is not equivalent in structure to the disclosed structure for performing the functions in the exemplary implementations of the present disclosure as shown herein. Moreover, although certain features of the present disclosure have been disclosed with respect to only one of several implementations, such features may be combined with one or other features of other implementations as may be desired and advantageous for a given or particular application. Furthermore, the terms "comprising," "having" or "including" or their modifications are used in a particular embodiment or claim, and such terms are intended to be encompassed in a manner similar to the term "comprising."

Each functional unit in the embodiment of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium. The storage medium mentioned above may be a read only memory, a magnetic disk or an optical disk or the like. Each of the above-described devices or systems can perform the method in the corresponding method embodiments.

In an embodiment, a computer apparatus is provided comprising a memory and a processor. The memory storing therein a computer program that, when executed, implements the steps of the method of any of the above embodiments.

It is understandable to those skilled in the art that all or part of the process in the above mentioned embodiments can be completed by the related hardware commanded by computer programs instructions, wherein the computer program can be stored in a non-volatile computer readable storage medium. When the computer programs are executed, the process of the above embodiments of each method can be included. Wherein, any reference to memory, storage, database or other medium used in each embodiment provided in the present disclosure may include a non-volatile and/or a volatile storage. The non-volatile storage can include read-only memory (ROM), programmable ROM (PROM), electrically programmable ROM (EPROM), electrically erasable programmable ROM (EEPROM) or flash memory. Volatile memory can include random access memory (RAM) or external cache. As a description rather than a limit, RAM is available in a variety of forms, such as static RAM (SRAM), dynamic RAM (DRAM), synchronous DRAM (SDRAM), dual data rate SDRAM (DDRSDRAM), enhanced SDRAM (ESDRAM), Synchlink DRAM (SLDRAM), and Rambus DRAM (RDRAM), Direct Rambus DRAM (DRDRAM).

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure. It will also be appreciated that some of the steps or blocks of the methods of the present application may be performed in parallel or in a different order than illustrated.

What is claimed is:

1. A method for terahertz ISAR imaging, comprising:
transmitting a linear frequency modulation signal from a terahertz ISAR to an imaging target, and receiving an echo signal $s_r(t,u)$ by the terahertz ISAR, when the imaging target being horizontally conveyed by a travolator and synchronously moved with the travolator at a preset speed;
setting a target reference position, and acquiring a reference signal $s_0(t)$ according to the target reference position;
using the reference signal $s_0(t)$ to perform a matched filtering in a fast time domain on the echo signal $s_r(t,u)$ to obtain a data matrix $S_M(\omega,u)$;
performing a baseband transformation in a slow time domain on the data matrix $S_M(\omega,u)$ to obtain a baseband transformed data matrix $S_b(\omega,u)$ and a corresponding signal spectrum $S_b(\omega,k_u)$;
correcting the baseband transformed data matrix $S_b(\omega,u)$ to eliminate a fast time domain zero offset, thereby obtaining a corrected data matrix $S(w,k_u)$;
using a phase function of the reference signal to perform another baseband transformation on the corrected data matrix $S(w,k_u)$ to obtain a first target function $F(k_x,k_y)$;
discretizing the first target function $F(k_x,k_y)$ to obtain $F(k_{xmn}, k_{ymn})$, and interpolating on a $k_{xmn}$ domain to uniformly distribute the $F(k_{xmn},k_{ymn})$ on the $k_{xmn}$ domain; and
performing an inverse transformation on the interpolated first target function to obtain a second target function $f(x_n, y_n)$ to generate a two-dimensional image of the imaging target.

2. The method for terahertz ISAR imaging of claim 1, wherein the using the reference signal $s_0(t)$ perform the matched filtering on the echo signal $s_r(t,u)$ comprises performing the matched filtering on the echo signal through a demodulation method.

3. The method for terahertz ISAR imaging of claim 1, wherein in the performing the baseband transformation in the slow time domain on the data matrix $S_M(\omega,u)$, the baseband transformation satisfies $S_b(\omega,u)=S_M(\omega,u)\exp(-j2k_c \sin\theta_c u)$ wherein $$k_c = \frac{2\pi f_c}{c}, \theta_c = \arctan\left(\frac{Y_c}{X_c}\right),$$

c is a speed of a terahertz wave, and $f_c$ is a frequency of the terahertz wave.

4. The method for terahertz ISAR imaging of claim 1, wherein the performing the baseband transformation on the data matrix $S_M(\omega,u)$ to obtain the baseband transformed data matrix $S_b(\omega,u)$ and corresponding signal spectrum $S_b(\omega,k_u)$ comprises:

performing a Fourier transformation in the slow time domain on the baseband transformed data matrix $S_b(\omega, u)$ to obtain the signal spectrum $S_b(\omega,k_u)$.

5. The method for terahertz ISAR imaging of claim 1, wherein the correcting the baseband transformed data matrix $S_b(\omega,u)$ to eliminate the fast time domain zero offset comprises:
correcting the baseband transformed data matrix $S_b(\omega,u)$, wherein $S(\omega,k_u)=S_b(\omega,k_u) \exp(-j\omega T_c)$.

6. The method for terahertz ISAR imaging of claim 1, wherein in the using the phase function of the reference signal to perform the baseband transformation on the corrected data matrix $S(w,k_u)$, the baseband transformation satisfies $F(k_x,k_y)=S(\omega,k_u)\exp(j\sqrt{4k^2-k_u^2}X_c+jk_u Y_c)$, wherein $k_x=\sqrt{4k^2-k_u^2}$, $k_y=k_u$.

7. The method for terahertz ISAR imaging of claim 1, wherein in the discretizing the first target function $F(k_x,k_y)$ to obtain $F(k_{xmn},k_{ymn})$, and interpolating on the $k_{xmn}$ domain, the interpolating is performed through a Stolt interpolation method satisfying $$F(k_x, k_{ymn}) = \sum_n J_m(n\Delta_\omega) F(n\Delta_{k_x}, k_{ymn}) h(k_x - n\Delta_{k_x})$$

wherein $$h(k_x) = \mathrm{sinc}\left(\frac{k_x}{\Delta_{k_x}}\right), J_m(\omega) = \frac{4k}{c\sqrt{4k^2+k_{um}^2}}.$$

8. A system for terahertz ISAR imaging, comprising:
a terahertz ISAR configured to transmit a terahertz wave to an imaging target and receive an echo signal;
a travolator configured to horizontally convey the imaging target to synchronously move the imaging target with the travolator;
a control unit configured to control an operation of the terahertz ISAR and a speed of the travolator; and
an image processing unit creating an image for the imaging target according to the echo signal and the speed of the travolator;
wherein the image processing unit further comprises:
a reference signal generating module configured to generate a reference signal according to a hypothetical target reference position $(X_c, Y_c)$;
a matched filtering module configured to receive a reference signal $s_0(t)$ generated by the reference signal generating module, and use the reference signal $s_0(t)$ to perform a matched filtering in a fast time domain on the echo signal $s_r(t,u)$ to obtain a data matrix $S_M(\omega,u)$;
a first baseband transform module configured to receive the data matrix $S_M(\omega,u)$, and perform a baseband transformation in a slow time domain on the data matrix $S_M(\omega,u)$ to obtain a baseband transformed data matrix $S_b(\omega,u)$ and a corresponding signal spectrum $S_b(\omega,k_u)$;
a zero offset elimination module configured to receive the signal spectrum $S_b(\omega,k_u)$ obtained by the first baseband transform module, correct the signal spectrum $S_b(\omega,k_u)$ to eliminate a fast time domain zero offset, and obtain a corrected data matrix $S(w,k_u)$, wherein $S(\omega,k_u)=S_b(\omega,k_u)\exp(-j\omega T_c)$;
a second baseband transform module configured to receive the corrected data matrix $S(w,k_u)$ from the zero offset elimination module, and use a phase function of the reference signal to perform another baseband transformation on the corrected data matrix $S(w,k_u)$ to obtain a first target function $F(k_x,k_y)$;

a difference module configured to receive the first target function $F(k_x,k_y)$ obtained by the second baseband transform module, discretize the first target function $F(k_x,k_y)$ to obtain $F(k_{xmn},k_{ymn})$, and interpolate on a $k_{xmn}$ domain to uniformly distribute the $F(k_{xmn},k_{ymn})$ on the $k_{xmn}$ domain; and a two-dimensional inverse Fourier transform module configured to receive the interpolated first target function obtained by the difference module, and perform a two-dimensional inverse Fourier transformation on the interpolated first target function to obtain a second target function $f(x_n,y_n)$, which is a two-dimensional image of the imaging target.

9. The system for terahertz ISAR imaging of claim 8, wherein the terahertz ISAR transmits signal in a transmitting power of 5 mW, a center frequency of 340 GHz, and a bandwidth of 7.2 GHz.

\* \* \* \* \*